Figure 1:
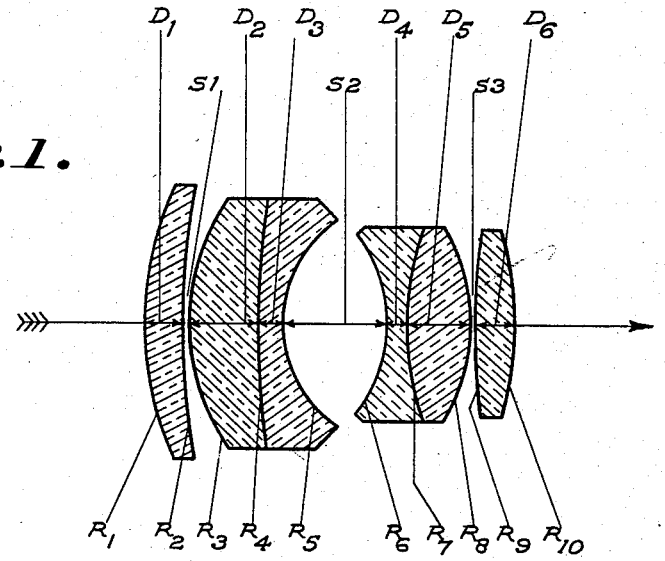

May 10, 1938.    H. W. LEE    2,117,252
LENSES FOR PHOTOGRAPHY AND THE LIKE
Filed Dec. 17, 1936

Inventor:
Horace William Lee
per
Arthur L. Kent
his Attorney.

Patented May 10, 1938

2,117,252

UNITED STATES PATENT OFFICE 2,117,252

LENS FOR PHOTOGRAPHY AND THE LIKE

Horace William Lee, Chiswick, London, England, assignor to Kapella Limited, Leicester, England, a corporation of England Application December 17, 1936, Serial No. 116,388
In Great Britain December 18, 1935

3 Claims. (Cl. 88—57)

This invention relates to lenses of the kind comprising two compound meniscus dispersive components with their concave exterior surfaces facing one another, said components being between two collective components having surfaces of different curvatures and having their more strongly curved surfaces turned outwards, and it has for its object to provide lenses well corrected for chromatic aberration, coma, astigmatism and distortion and better corrected for spherical aberration than hitherto.

In specification 1,955,591 of patent granted to me, lenses of the kind referred to are described in which the concave exterior surface of the rear dispersive component has a radius greater than 0.3 the focal length of the system, and its convex exterior surface has a radius greater than 0.4 such focal length.

The lens of Lee 1,955,591, while giving extremely high definition, and, at the same time, being corrected for distortion, can be improved in respect of the correction of residual spherical aberration by the means herein described.

While the aim of lens designers is, for a number of reasons, to use lens surfaces with as large radii as possible consistent with securing the desired corrections, I have found in the present case better results are obtained, especially so far as spherical aberration is concerned, by decreasing the radii of the opposing concave surfaces of the compound dispersive components and at the same time increasing the refractive index of each convergent element of such dispersive components with respect to its associated divergent element. These changes do not cut down appreciably the definition of the lens.

In lenses according to the present invention, the concave exterior surface of the rear dispersive component may have a radius not greater than 0.3 or less than 0.2 the focal length of the system, and its convex exterior surface may have a radius not greater than 0.4 or less than 0.25 such focal length, provided that I use, in each convergent component of the compound divergent menisci, glass of a refractive index greater than that in the divergent component associated with it but not exceeding it by more than .03.

In lenses according to this invention it is necessary, in order that they be corrected for distortion, that the following conditions shall be observed:—

(1) The spherical aberration on the concave surface of the rear meniscus dispersive component (that on the shorter conjugate side of the system) is between 75% and 200% greater than that on the concave surface of the front meniscus dispersive component.

(2) The point midway between the images of the front and rear surfaces of the entire system, in the space on the long conjugate side of the system, divides the space between the images of the concave surfaces of the dispersive elements in a ratio not exceeding 3:1, counting such spaces in order from the long conjugate side of the system.

Figure 2:
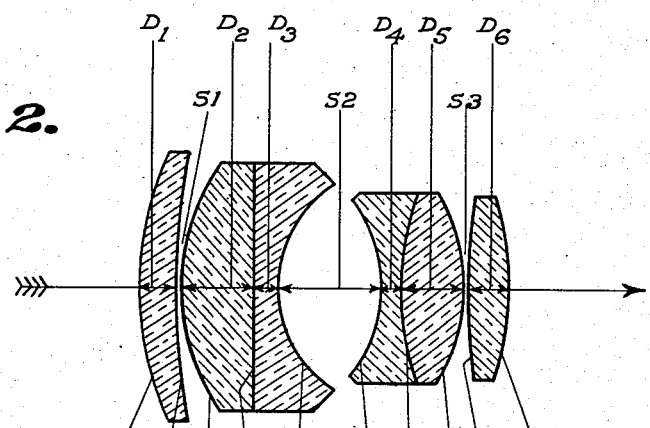
Figure 3:
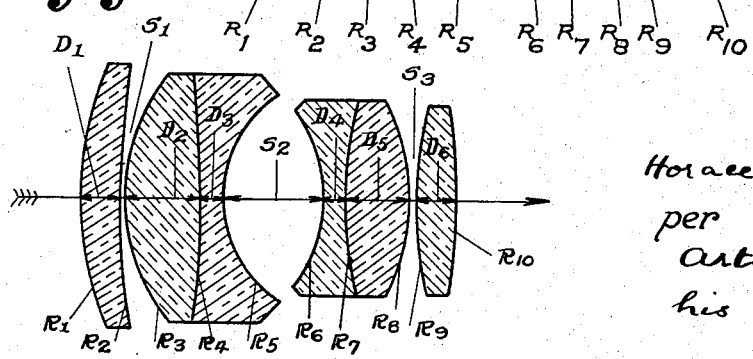

Three forms of lenses embodying the invention are shown, by way of example, in the accompanying drawing. Figs. 1, 2 and 3 are axial sections of the three forms of construction.

I now give data for the construction of the three examples, Example I being that shown in Fig. 1, and so on. The notation is that the successive radii of curvature, counting from the front, are called $R_1$, $R_2$, etc., the sign $+$ denoting that the curve is convex toward the incident light, and $-$ that it is concave toward the same. The axial thicknesses of the elements are denoted by $D_1$, $D_2$, etc., and the separations of the components by $S_1$, $S_2$, etc.

The material is defined in terms of the mean refractive index $^nD$, as conventionally employed, followed by the type number in Messrs. Chance Brothers' optical glass catalogue. The Abbe V number also is given.

*Example I*

| Aperture F/2 | | Equivalent focal length 1.0 | | | |
|---|---|---|---|---|---|
| Radii | Thickness | Separation | $^nD$ | V | No. |
| $R_1 + .644$ | $D_1$ .08 | | 1.61 | 53.3 | 610533 |
| $R_2 + 2.650$ | | $S_1$ .005 | | | |
| $R_3 + .404$ | $D_2$ .146 | | 1.6234 | 56.2 | 623562 |
| $R_4 + 2.267$ | $D_3$ .040 | | 1.6083 | 39.6 | 608396 |
| $R_5 + .247$ | | $S_2$ .20 | | | |
| $R_6 - .289$ | | | | | |
| $R_7 + .464$ | $D_4$ .040 | | 1.6054 | 38.0 | 605380 |
| $R_8 - .374$ | $D_5$ .130 | | 1.6209 | 57.2 | 621572 |
| $R_9 + 1.789$ | | $S_3$ .005 | | | |
| $R_{10} - 1.04$ | $D_6$ .081 | | 1.6234 | 56.2 | 623562 |

Example II

| Aperture F/2 | | | Equivalent focal length 1.0 | | |
|---|---|---|---|---|---|
| Radii | Thickness | Separation | nD | V | No. |
| $R_1 + .6440$ | $D_1$ .080 | | 1.61 | 53.3 | 610533 |
| $R_2 +2.534$ | | $S_1$ .005 | | | |
| $R_3 + .4011$ | $D_2$ .146 | | 1.6234 | 56.2 | 623562 |
| $R_4$ ∞ | $D_3$ .040 | | 1.6083 | 39.6 | 608396 |
| $R_5 + .2477$ | | $S_2$ .20 | | | |
| $R_6 - .2880$ | $D_4$ .040 | | 1.6054 | 38.0 | 605380 |
| $R_7 + .5840$ | $D_5$ .130 | | 1.6209 | 57.2 | 621572 |
| $R_8 - .3798$ | | $S_3$ .005 | | | |
| $R_9 +1.670$ | $D_6$ .081 | | 1.6234 | 56.2 | 623562 |
| $R_{10} -1.040$ | | | | | |

Example III

| Aperture F/2 | | | Equivalent focal length 1.0 | | |
|---|---|---|---|---|---|
| Radii | Thickness | Separation | nD | V | No. |
| $R_1 + .6440$ | $D_1$ .08 | | 1.61 | 53.3 | 610533 |
| $R_2 +2.421$ | | $S_1$ .005 | | | |
| $R_3 + .3983$ | $D_2$ .146 | | 1.6234 | 56.2 | 623562 |
| $R_4 -2.222$ | $D_3$ .040 | | 1.6083 | 39.6 | 608396 |
| $R_5 + .2469$ | | $S_2$ .20 | | | |
| $R_6 - .2891$ | $D_4$ .040 | | 1.6054 | 38.0 | 605380 |
| $R_7 + .7937$ | $D_5$ .130 | | 1.6209 | 57.2 | 621572 |
| $R_8 - .3818$ | | $S_3$ .005 | | | |
| $R_9 +1.631$ | $D_6$ .081 | | 1.6234 | 56.2 | 623562 |
| $R_{10} -1.040$ | | | | | |

What is claimed is:

1. A lens system comprising two compound meniscus dispersive members with their concave exterior surfaces facing one another, said members being arranged between two collective members, all of said members being axially aligned and air separated from each other, the dispersive members each comprising a collective element and a dispersive element, the collective elements of the dispersive members being arranged between their respective dispersive elements and the adjacent collective members, one at least of the collective members having exterior surfaces of different curvature and being arranged with the more strongly curved surface facing outwards, the concave exterior surface of the rear dispersive member having a radius not greater than 0.3 and not less than 0.2 the focal length of the system and its convex exterior surface a radius not greater than 0.4 and not less than 0.25 such focal length, the refractive index of each collective element of the compound dispersive members exceeding that of the dispersive element associated with it but by not more than 0.03.

2. Lenses as claimed in claim 1, in which the spherical aberration on the concave exterior surface of the rear meniscus dispersive member is between 75% and 200% greater than that on the concave surface of the front meniscus dispersive member.

3. Lenses as claimed in claim 1, in which the point midway between the images of the front and rear surfaces of the entire system, in the space on the long conjugate side of the system, divides the space between the images of the concave surfaces of the dispersive elements in a ratio not exceeding 3:1, counting such spaces in order from the long conjugate side of the system.

HORACE WILLIAM LEE.